United States Patent
Bazhenov et al.

(10) Patent No.: US 12,511,524 B2
(45) Date of Patent: Dec. 30, 2025

(54) BIOLOGICALLY INSPIRED SLEEP ALGORITHM FOR ARTIFICIAL NEURAL NETWORKS

(71) Applicant: THE REGENTS OF THE UNIVERSITY OF CALIFORNIA, Oakland, CA (US)

(72) Inventors: Maksim Bazhenov, San Diego, CA (US); Giri Prashanth Krishnan, San Diego, CA (US); Timothy Tadros, San Diego, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 950 days.

(21) Appl. No.: 17/627,092

(22) PCT Filed: Jul. 17, 2020

(86) PCT No.: PCT/US2020/042686
§ 371 (c)(1),
(2) Date: Jan. 13, 2022

(87) PCT Pub. No.: WO2021/011931
PCT Pub. Date: Jan. 21, 2021

(65) Prior Publication Data
US 2022/0374679 A1    Nov. 24, 2022

Related U.S. Application Data

(60) Provisional application No. 62/875,444, filed on Jul. 17, 2019.

(51) Int. Cl.
*G06N 3/049* (2023.01)
*G06N 3/048* (2023.01)
(Continued)

(52) U.S. Cl.
CPC .............. *G06N 3/049* (2013.01); *G06N 3/048* (2023.01); *G06N 3/082* (2013.01); *G06N 3/084* (2013.01); *G06N 3/088* (2013.01)

(58) Field of Classification Search
CPC ........ G06N 3/049; G06N 3/048; G06N 3/084; G06N 3/082; G06N 3/088
See application file for complete search history.

(56) References Cited

U.S. PATENT DOCUMENTS

2015/0052093 A1*   2/2015   Canoy ................... G06N 3/049
                                                          706/25
2018/0121802 A1   5/2018   Ruckauer et al.

FOREIGN PATENT DOCUMENTS

CA        2898216        1/2017

OTHER PUBLICATIONS

Diehl, Peter U., et al. "Fast-classifying, high-accuracy spiking deep networks through weight and threshold balancing." 2015 International joint conference on neural networks (IJCNN). ieee, 2015. (Year: 2015).*

(Continued)

*Primary Examiner* — Cesar B Paula
*Assistant Examiner* — Maxwell August Ludwikowski
(74) *Attorney, Agent, or Firm* — Sheppard, Mullin, Richter & Hampton LLP

(57) ABSTRACT

Systems and methods for generating Artificial Neural Networks (ANNs) based on the principles of biological sleep are disclosed. Namely, the systems and methods can be configured to apply a sleep-like phase to ANNs which enables training to be generalized, performance to be improved, and catastrophic forgetting for sequential multi-task training to be prevented. Various implementations of these systems and methods can be configured to: (i) train an ANN using backpropagation algorithm, (ii) convert the (Continued)

architecture of the ANN to an equivalent Spiking Neural Network (SNN) and simulate a sleep phase in the SNN while using plasticity rules to modify synaptic weights, and (iii) convert the modified synaptic weights associated with the simulated sleep phase of the SNN back into the ANN. This transformation from ANN to SNN to ANN effectively emulates learning mechanisms actuated during biological sleep and, as such, overcomes limitations commonly associated with machine learning.

21 Claims, 23 Drawing Sheets

(51) Int. Cl.
  *G06N 3/082* (2023.01)
  *G06N 3/084* (2023.01)
  *G06N 3/088* (2023.01)

(56) References Cited

OTHER PUBLICATIONS

Dorogyy, Yaroslav, and Vadym Kolisnichenko. "Unsupervised PreTraining with Spiking Neural Networks in Semi-Supervised Learning." 2018 IEEE First International Conference on System Analysis & Intelligent Computing (SAIC). IEEE, 2018. (Year: 2018).*

Early, Joseph. "Reducing catastrophic forgetting when evolving neural networks." arXiv preprint arXiv:1904.03178 (2019). (Year: 2019).*

Kasabov, Nikola K., and Nikola K. Kasabov. "Evolving spiking neural networks." Time-space, spiking neural networks and brain-inspired artificial intelligence (2019): 169-199. (Year: 2019).*

Liu, Qian, Yunhua Chen, and Steve Furber. "Noisy softplus: an activation function that enables snns to be trained as anns." arXiv preprint arXiv:1706.03609 (2017). (Year: 2017).*

Thiele, Johannes, Peter Diehl, and Matthew Cook. "A wake-sleep algorithm for recurrent, spiking neural networks." arXiv preprint arXiv:1703.06290 (2017). (Year: 2017).*

Rasch et al., "About Sleep's Role In Memory," American Physiological Society, vol. 93 (2013), pp. 681-766.

International Search Report and Written Opinion mailed Dec. 1, 2020 for International Application No. PCT/US2020/042686, filed Jul. 17, 2020.

\* cited by examiner

|        | Train Task 1 | Sleep | Train Task 2 | Sleep |
|--------|--------------|-------|--------------|-------|
| Task 1 | 100          | 100   | 66.7         | 100   |
| Task 2 | 0            | 50    | 100          | 100   |

Fig. 1B

|        | Train Task 1 | Train Task 2 | Sleep |
|--------|--------------|--------------|-------|
| Task 1 | 100          | 66.67        | 100   |
| Task 2 | 0            | 100          | 100   |

Fig. 1C

| Accuracy | T | S | T | S | T | S | T | S | T | S |
|---|---|---|---|---|---|---|---|---|---|---|
| TASK 1 | 0 | 2.174 | 0 | 0.992 | 0 | 14.18 | 99.81 | 81.74 | 0 | 96.64 |
| TASK 2 | 0 | 2.203 | 0 | 3.868 | 95.69 | 65.27 | 0 | 72.08 | 0 | 68.75 |
| TASK 3 | 98.13 | 89.64 | 0 | 89.00 | 0 | 80.04 | 0 | 56.72 | 0 | 34.31 |
| TASK 4 | 0 | 7.150 | 98.84 | 64.55 | 0 | 73.41 | 0 | 72.86 | 0 | 78.70 |
| TASK 5 | 0 | 3.731 | 0 | 1.613 | 0 | 2.571 | 0 | 2.521 | 96.06 | 54.61 |
| All tasks | 18.39 | 19.87 | 19.63 | 30.82 | 19.54 | 46.42 | 21.11 | 57.61 | 19.05 | 67.37 |

Phase

Fig. 2A

Activation Correlations in Layer2

Before Sleep

|   | 0 | 1 | 2 | 3 | 4 | 5 | 6 | 7 | 8 | 9 |
|---|---|---|---|---|---|---|---|---|---|---|
| 0 | 0.63 | 0.39 | 0.54 | 0.53 | 0.41 | 0.56 | 0.49 | 0.37 | 0.55 | 0.41 |
| 1 | 0.39 | 0.70 | 0.53 | 0.54 | 0.39 | 0.53 | 0.45 | 0.39 | 0.58 | 0.43 |
| 2 | 0.54 | 0.53 | 0.66 | 0.59 | 0.49 | 0.60 | 0.58 | 0.43 | 0.66 | 0.48 |
| 3 | 0.53 | 0.54 | 0.59 | 0.67 | 0.44 | 0.65 | 0.50 | 0.42 | 0.66 | 0.47 |
| 4 | 0.41 | 0.39 | 0.49 | 0.44 | 0.67 | 0.46 | 0.48 | 0.64 | 0.52 | 0.67 |
| 5 | 0.56 | 0.53 | 0.60 | 0.65 | 0.46 | 0.66 | 0.53 | 0.43 | 0.67 | 0.48 |
| 6 | 0.49 | 0.45 | 0.58 | 0.50 | 0.48 | 0.53 | 0.61 | 0.41 | 0.57 | 0.46 |
| 7 | 0.37 | 0.39 | 0.43 | 0.42 | 0.64 | 0.43 | 0.41 | 0.69 | 0.48 | 0.68 |
| 8 | 0.55 | 0.58 | 0.66 | 0.66 | 0.52 | 0.67 | 0.57 | 0.48 | 0.72 | 0.53 |
| 9 | 0.41 | 0.43 | 0.48 | 0.47 | 0.67 | 0.48 | 0.46 | 0.68 | 0.53 | 0.70 |

Fig. 3A

Activation Correlations in Layer2

After Sleep

|   | 0 | 1 | 2 | 3 | 4 | 5 | 6 | 7 | 8 | 9 |
|---|---|---|---|---|---|---|---|---|---|---|
| 0 | 0.51 | 0.00 | 0.02 | 0.14 | -0.01 | 0.18 | 0.02 | 0.00 | 0.04 | 0.00 |
| 1 | 0.00 | 0.65 | 0.21 | 0.24 | 0.06 | 0.18 | 0.09 | 0.09 | 0.34 | 0.11 |
| 2 | 0.02 | 0.21 | 0.28 | 0.09 | 0.03 | 0.06 | 0.12 | 0.03 | 0.13 | 0.02 |
| 3 | 0.14 | 0.24 | 0.09 | 0.42 | 0.02 | 0.32 | 0.04 | 0.04 | 0.25 | 0.07 |
| 4 | -0.01 | 0.06 | 0.03 | 0.02 | 0.34 | 0.01 | 0.04 | 0.31 | 0.05 | 0.35 |
| 5 | 0.18 | 0.18 | 0.06 | 0.32 | 0.01 | 0.29 | 0.04 | 0.03 | 0.20 | 0.05 |
| 6 | 0.02 | 0.09 | 0.12 | 0.04 | 0.04 | 0.04 | 0.39 | 0.01 | 0.06 | 0.01 |
| 7 | 0.00 | 0.09 | 0.03 | 0.04 | 0.31 | 0.03 | 0.01 | 0.51 | 0.07 | 0.45 |
| 8 | 0.04 | 0.34 | 0.13 | 0.25 | 0.05 | 0.20 | 0.06 | 0.07 | 0.34 | 0.09 |
| 9 | 0.00 | 0.11 | 0.02 | 0.07 | 0.35 | 0.05 | 0.01 | 0.45 | 0.09 | 0.47 |

Fig. 3B

Activation Correlations in Layer4

Before Sleep

|   | 0 | 1 | 2 | 3 | 4 | 5 | 6 | 7 | 8 | 9 |
|---|---|---|---|---|---|---|---|---|---|---|
| 0 | 0.96 | 0.94 | 0.93 | 0.95 | 0.08 | 0.94 | 0.90 | 0.08 | 0.95 | 0.08 |
| 1 | 0.94 | 0.93 | 0.91 | 0.93 | 0.20 | 0.92 | 0.90 | 0.19 | 0.93 | 0.19 |
| 2 | 0.93 | 0.91 | 0.90 | 0.92 | 0.12 | 0.91 | 0.87 | 0.12 | 0.92 | 0.12 |
| 3 | 0.95 | 0.93 | 0.92 | 0.94 | 0.08 | 0.93 | 0.89 | 0.08 | 0.94 | 0.08 |
| 4 | 0.08 | 0.20 | 0.12 | 0.08 | 0.93 | 0.11 | 0.23 | 0.91 | 0.11 | 0.92 |
| 5 | 0.94 | 0.92 | 0.91 | 0.93 | 0.11 | 0.92 | 0.89 | 0.11 | 0.93 | 0.11 |
| 6 | 0.90 | 0.90 | 0.87 | 0.89 | 0.23 | 0.89 | 0.87 | 0.22 | 0.89 | 0.22 |
| 7 | 0.08 | 0.19 | 0.12 | 0.08 | 0.91 | 0.11 | 0.22 | 0.89 | 0.11 | 0.90 |
| 8 | 0.95 | 0.93 | 0.92 | 0.94 | 0.11 | 0.93 | 0.89 | 0.11 | 0.93 | 0.11 |
| 9 | 0.08 | 0.19 | 0.12 | 0.08 | 0.92 | 0.11 | 0.22 | 0.90 | 0.11 | 0.91 |

Fig. 3C

Activation Correlations in Layer4

After Sleep

|   | 0 | 1 | 2 | 3 | 4 | 5 | 6 | 7 | 8 | 9 |
|---|---|---|---|---|---|---|---|---|---|---|
| 0 | 0.92 | -0.11 | -0.09 | -0.04 | -0.16 | 0.08 | -0.09 | -0.14 | -0.10 | -0.17 |
| 1 | -0.11 | 0.78 | -0.11 | -0.12 | -0.10 | -0.09 | -0.13 | -0.13 | -0.00 | -0.15 |
| 2 | -0.09 | -0.11 | 0.64 | -0.10 | -0.11 | -0.09 | -0.02 | -0.10 | -0.08 | -0.14 |
| 3 | -0.04 | -0.12 | -0.10 | 0.58 | -0.14 | 0.31 | -0.11 | -0.12 | -0.00 | -0.15 |
| 4 | -0.16 | -0.10 | -0.11 | -0.14 | 0.63 | -0.14 | -0.13 | 0.33 | -0.01 | 0.50 |
| 5 | 0.08 | -0.09 | -0.09 | 0.31 | -0.14 | 0.27 | -0.05 | -0.13 | 0.04 | -0.16 |
| 6 | -0.09 | -0.13 | -0.02 | -0.11 | -0.13 | -0.05 | 0.71 | -0.15 | -0.07 | -0.18 |
| 7 | -0.14 | -0.13 | -0.10 | -0.12 | 0.33 | -0.13 | -0.15 | 0.72 | -0.08 | 0.47 |
| 8 | -0.10 | -0.00 | -0.08 | -0.00 | -0.01 | -0.04 | -0.07 | -0.08 | 0.23 | -0.09 |
| 9 | -0.17 | -0.15 | -0.14 | -0.15 | 0.50 | -0.16 | -0.18 | 0.47 | -0.09 | 0.61 |

Fig. 3D

BIOLOGICALLY INSPIRED SLEEP ALGORITHM FOR ARTIFICIAL NEURAL NETWORKS

REFERENCE TO RELATED APPLICATIONS

The present application is a U.S. national phase of PCT International Patent Application No. PCT/US2020/042686, filed Jul. 17, 2020 and titled "BIOLOGICALLY INSPIRED SLEEP ALGORITHM FOR ARTIFICIAL NEURAL NETWORKS", which claims priority to U.S. Provisional Application No. 62/875,444, filed Jul. 17, 2019 and titled "BIOLOGICALLY INSPIRED SLEEP ALGORITHM FOR ARTIFICIAL NEURAL NETWORKS," all of which are incorporated herein by reference in their entirety.

STATEMENT REGARDING FEDERALLY SPONSORED R&D

This invention was made with government support under Grant No. HR0011-18-2-0021, awarded by the Defense Advanced Research Projects Agency (DARPA). The government has certain rights in the invention.

TECHNICAL FIELD

Various embodiments generally relate to machine learning architectures, and in particular, some embodiments may relate to improved artificial neural networks (ANNs) incorporating processes associated with sleep generation in biological networks.

SUMMARY OF THE EMBODIMENTS

An aspect of the present disclosure relates to a method of generating Artificial Neural Networks (ANNs) including, but not limited to, feedforward and recurrent networks to: improve performance of the ANNs that are trained using a limited dataset where performance is unsatisfactory; improve ability of the ANN to process new types of data including but not limited to the data with different statistics, e.g., noisy data; enable ability of the ANN to avoid catastrophic forgetting of the previously learned tasks by applying the method multiple times between individual task training; and enhance ANN resistance to adversarial attacks.

An additional aspect of the present disclosure relates to a method a computer-implemented method for transformation of an ANN using biological sleep mechanisms for memory activation and synaptic plasticity, the method being implemented in a computer system that includes one or more physical computer processors, non-transitory electronic storage, and a graphical user interface, the method including obtaining, via the graphical user interface, a training dataset, training parameters, corresponding to the training dataset, and training algorithms; obtaining an initial ANN model; applying the training dataset, the training parameters, and the training algorithms to the initial ANN model via the graphical user interface; training the initial ANN model by using the training data, generating a trained ANN model; converting the trained ANN model to a spiking neural network (SNN) model, the converting comprising simulating a sleep phase in the SNN model by applying plasticity rules to modify synaptic weights; converting the SNN model to an updated ANN model, the converting comprising transferring the modified synaptic weights associated with the sleep phase of the SNN model to update the trained ANN model; storing the updated ANN model.

Another aspect of the present disclosure relates to a method for applying sleep mechanisms to artificial neural networks (ANNs) comprising: converting a first ANN to a spiked neural network (SNN), the converting comprising: mapping weights from the first ANN to SNN, the SNN comprises a network of integrate-fire units, and applying weight normalization and returning scale for each layer of the SNN; simulating a sleep phase in the SNN, the simulating comprising: applying plasticity rules to the SNN to modify the weights of the SNN based on spike-timing dependent plasticity (STDP); and converting the SNN to a second ANN, the converting comprising: mapping weights from the SNN to the first ANN to generate the second ANN, and storing the second ANN.

An aspect of the present disclosure provides a method for training the generated second ANN to perform a first task; converting the generated second ANN to an associated SNN; simulating the sleep phase in the associated SNN; generating a third ANN; training the generated third ANN to perform a second task; converting the generated third ANN to an associated SNN; simulating the sleep phase in the associated SNN; generating a fourth ANN; and applying the generated fourth ANN to the first and second tasks.

A further aspect of the present disclose relates to a computer system for training and applying a transformed artificial neural network (ANN), the system comprising training an initial ANN using a backpropagation algorithm, the ANN comprising rectified linear units (ReLU) representing neurons; transforming the trained ANN to a spiking neural network (SNN), the transformation comprising: replacing the ReLU of the ANN with spiking neurons implemented using a spiking mode and replacing weights between the ReLU with synaptic connections using a model applicable to the SNN; implementing plasticity rules to modify synaptic weights; the plasticity rules corresponding to at least one Hebbian rules, spike-timing dependent plasticity (STDP), heterosynaptic, and homeostatic plasticity; transforming the transformed SNN back to the trained ANN to generate an updated trained ANN, the updated trained ANN comprises the derived weights of the transformed SNN mapped thereto; and using the updated trained ANN to perform one or more tasks, wherein the updated trained ANN undergoes one or more additional transformations between performance of the one or more tasks.

These and other features, and characteristics of the present technology, as well as the methods of operation and functions of the related elements of structure and the combination of parts, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the presently disclosed technology. As used in the specification and in the claims, the singular form of 'a', 'an', and 'the' include plural referents unless the context clearly dictates otherwise.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

FIG. 1 provides an example implementation and evaluation of the sleep algorithm, in accordance with various embodiments of the present disclosure.

FIG. 1B illustrates an example graph of the accuracy of trained tasks after training and sleep phases, in accordance with various embodiments of the present disclosure.

FIG. 1C illustrates the same as FIG. 1B with only one sleep phase, in accordance with various embodiments of the present disclosure.

FIGS. 2A-2E illustrate an example implementation and evaluation of the sleep algorithm on MNIST and CUB200 datasets, in accordance with various embodiments disclosure.

FIG. 2A illustrates an example graph of the accuracy for each of the 5 tasks and overall as a function of training phases, in accordance with various embodiments of the present disclosure.

FIG. 2B illustrates an example confusion matrix after the first awake and sleep phases, in accordance with various embodiments of the present disclosure.

FIG. 2C illustrates the same as FIG. 2B but after last training and sleep phases, in accordance with various embodiments of the present disclosure.

FIG. 2D illustrates an example summary MNIST performance graph comparing sleep vs a simple fully connected network, in accordance with various embodiments of the present disclosure.

FIG. 2E illustrates an example summary CUB2000 performance graph depicting the accuracy of trained tasks after training and sleep phases, in accordance with various embodiments of the present disclosure.

FIGS. 3A-3D illustrate example correlation graphs demonstrating sleep decreases representational overlap between MNIST classes at all layers, in accordance with various embodiments of the present disclosure.

FIGS. 3A-3B illustrate an example graphs of the average correlations of activations in the first hidden layer for each digit, in accordance with various embodiments of the present disclosure.

FIGS. 3C-3D illustrate the same as FIGS. 3A-3B except correlations are computed in the output layer, in accordance with various embodiments of the present disclosure.

FIG. 4A illustrates an example graph depicting the performance of the sleep algorithm in classifying degraded images for the MNIST dataset, in accordance with various embodiments of the present disclosure.

FIG. 4B illustrates the same as FIG. 4A for the Patches dataset, in accordance with various embodiments of the present disclosure.

FIG. 4C illustrates an example confusion matrix before and after sleep for low noise and blue for the MNIST dataset, in accordance with various embodiments of the present disclosure.

FIG. 4D illustrates a confusion matrix before and after sleep for low noise and blue for the Patches dataset, in accordance with various embodiments of the present disclosure.

FIGS. 5A-5D illustrate an example implementation and evaluation of the sleep algorithm exposed to adversarial attacks, in accordance with various embodiments of the present disclosure.

FIG. 5A illustrates an example graph depicting the performance of the sleep algorithm on classifying images with various amounts of distortion in a Patches dataset, as caused by a single adversarial attack, in accordance with various embodiments of the present disclosure.

FIG. 5B illustrates an example graph depicting the performance of the sleep algorithm on classifying images with various amounts of distortion in a MNIST dataset, as caused by a single adversarial attack, in accordance with various embodiments of the present disclosure.

FIG. 5C illustrates an example graph depicting the performance of the sleep algorithm on classifying images with various amounts of distortion in a CUB200 dataset, as caused by a single adversarial attack, in accordance with various embodiments of the present disclosure.

Figure 1A:
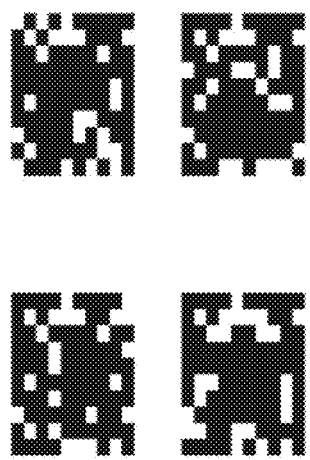
FIG. 1A is an example illustration of a "Patches" dataset with 4 images with 15 pixel overlap among the images, in accordance with various embodiments of the present disclosure.

The figures are not intended to be exhaustive or to limit the embodiments to the precise form disclosed. It should be understood that all embodiments can be practiced with modification and alteration, and that the disclosed technology be limited only by the claims and the equivalents thereof.

DETAILED DESCRIPTION OF THE EMBODIMENTS

Although artificial neural networks (ANNs) have equaled and even surpassed human performance on various tasks, they nevertheless still suffer from a range of intrinsic limitations. To start, ANNs suffer from catastrophic forgetting. That is, while humans and animals can continuously learn from new information, ANNs perform well on new tasks while forgetting older tasks that are not explicitly retrained. Next, ANNs fail to generalize to multiple examples of the specific task for which ANNs were trained. The second limitation is tied to the sample data that is used to build a mathematical model or computational algorithm. Specifically, ANNs are usually trained with highly filtered datasets, which often constricts the extent to which the generated neural network can generalize beyond these filtered datasets (i.e., examples). In contrast, humans frequently form unrestricted generalizations based on the presence of limited and/or altered stimulus conditions. Lastly, related but also distinct from the second limitation, ANNs sometimes fail to transfer learning to other similar tasks apart from the ones they were explicitly trained on. Whereas humans can represent information in a generalized fashion that does not depend on the exact properties or conditions of how they learned the task. This ability allows the mammalian brain (e.g., humans) to transfer old knowledge to unlearned tasks, while the current state of deep learning models are unable to do so.

Sleep has been hypothesized to play an important role in memory consolidation and generalization of knowledge. During sleep, neurons are spontaneously active without external input and generate complex patterns of synchronized oscillatory activity across brain regions. Previously experienced or learned activity is believed to be replayed during sleep. This replay of the recently learned memories along with relevant old memories is thought to be the critical mechanism that results in memory consolidation. Accordingly, it would be highly desirable to adopt the main processes behind sleep activity to benefit ANNs performance based on the relevant biophysical models.

The principles of memory consolidation during sleep have conventionally been used to address the problem of catastrophic forgetting in ANNs. Several relevant instances include a generative model of the hippocampus and cortex to generate examples from a distribution of previously learned tasks in order to retrain (replay) these tasks during a sleep phase; generative algorithms to generate previously experienced stimuli during the next training period; and a loss function (termed elastic weight consolidation—EWC), which penalizes updates to weights deemed appropriate for previous tasks, made use of synaptic mechanisms of memory consolidation. Although these instances report positive results in preventing catastrophic forgetting, they also have associated limitations. First, EWC does not seem to work in an incremental learning framework. Second, generative models generally focus on the replay aspect of sleep; as such, it is unclear if these models could have potential benefits in addressing problems of generalization of knowledge. Further, generative models require a separate network that stores the statistics of previously learned inputs which imposes an additional cost, while rehearsal of small examples of different classes may be sufficient to prevent catastrophic forgetting.

The presently disclosed technology provides a sleep-inspired algorithm that makes use of two principles observed during sleep in biology: memory reactivation and synaptic plasticity. In one example, ANN is trained first using backpropagation algorithm. However, it should be appreciated that any other training algorithms can be applied to train ANN. After initial training, denoted awake training, the ANN is converted to a spiking neural network (SNN). In one example, unsupervised spike-timing-dependent plasticity (STDP) phase with noisy input and increased intrinsic network activity is performed to represent sleep up-states—dynamics found in deep sleep. However, it should be appreciated that any other plasticity rules can be applied to SNN during sleep phase and any other modifications can be applied to the network to simulate sleep phase. Finally, the weights from the SNN are converted back into the ANN and performance tested. The presently disclosed technology demonstrates a myriad of benefits by incorporating a sleep algorithm. For example, sleep reduces catastrophic forgetting by reactivation of older tasks, sleep increases the network's ability to generalize to noisy versions of the training set, and sleep allows the network to perform forward transfer learning.

The presently disclosed technology provides the first known sleep-like algorithm that improves ANNs ability to generalize on noisy versions of the input. Furthermore, the presently disclosed technology is more scalable, does not require memory storage of the previously seen inputs, and ultimately demonstrates that ANNs retain information about forgotten tasks that could be reactivated through sleep. The presently disclosed technology could be complimentary to previous approaches and, importantly, it provides a principled way to incorporate various features of sleep to wide range of neural network architectures.

A. Sleep Algorithm Approach to Machine Learning

In several embodiments, the general components of the sleep algorithm may include any class of ANN network trained on some task. This algorithm is applicable to any ANN with any form of connectivity (feedforward and recurrent). The ANN network is first converted to SNN. In one example, a previously developed algorithm is incorporated to convert the architecture in the feedforward network (FCN) (i.e., ANN) to an equivalent SNN. However, it should be appreciated that other algorithms may be used to convert the ANN to an equivalent SNN. In one example, the weights from an ANN with ReLU activation units are transferred directly to the SNN, which consists of leaky integrate-and-fire neurons and the weights are scaled by the maximum activation in each layer during training. Any other types of neurons and other modifications to the weights can be applied to obtain a desirable SNN. After building the SNN, a 'sleep' phase is applied which modifies the network connectivity. After running sleep phase, the weights are converted back into the ANN and testing or further training is performed.

Below, the details of the example implementation of the sleep phase are described in more detail. It should be noted that in other implementations, other changes can be applied to the weights, other inputs can be applied to the input layer, other spiking neuronal models can be utilized and other plasticity rules can be used to modify weights. In one example implementation, the input layer in the SNN is represented as a Poisson-distributed spike train with mean firing rate given by the average value of that unit in the ANN for all tasks seen so far. However, it should be appreciated that other inputs, including but not limited to the random input, or no input at all, can be applied. Either the entire average image seen so far (used for initial ANN training) or randomized portions of the average image seen so far or all the active regions during any of the inputs is presented. In one example, Spike Timing Dependent Plasticity (STDP) rule was applied to SNN. However, it should be appreciated that other plasticity rules, including but not limited to different versions of Hebbian or BCM rules, can be applied. To apply STDP, a one timestep of the network propagating activity is ran. Each layer has 2 important parameters that dictates its firing rate: a threshold and a synaptic scaling factor. The input to a neuron is computed as aWx, where a is the layer-specific synaptic scaling factor, W is the weight matrix, and x is the spiking activity (binary) of the previous layer. This input is added to the neuron's membrane potential. If the membrane potential exceeds a threshold, the neuron fires a spike and its membrane potential is reset. Otherwise, the potential decays exponentially. After each spike, weights are updated according to a modified sigmoidal weight-dependent STDP rule. Weights are increased if a pre-synaptic spike leads to a post-synaptic spike. Weights are decreased if a post-synaptic spike fires without a pre-synaptic spike.

In embodiments, the sleep algorithm was tested on various datasets, including a toy dataset which was used as a motivating example. The toy dataset, termed "Patches", consists of 4 images of binary pixels arranged in an N×N matrix (As shown in FIG. 1A). Each of the images has varying amount of overlap with the other 4 images to test catastrophic forgetting. Likewise, the patches are blurred so that on-pixels spillover into neighboring pixels making the dataset slightly different from the one the network was trained on. This dataset was utilized to show the benefits of the sleep algorithm in a simpler setting. The sleep algorithm was also tested on the MNIST and CUB200 datasets to ensure generalizability. For CUB200, the pre-trained Resnet embeddings previously used for catastrophic forgetting was applied.

To test catastrophic forgetting, an example incremental learning framework was utilized. The FCN was trained sequentially on groups of 2 classes for patches and MNIST and groups of 100 classes for CUB200. After training on a single task, the sleep algorithm was run as previously described before training on the next task. To test generalization, the FCN was trained on the entire dataset and compared this network's performance on classifying noisy or blurred images to the FCN that underwent sleep phase after training. Regarding transfer learning, a network trained on one task, when put to sleep, improves performance on a new, unseen task. Dataset specific parameters for training and sleep in the catastrophic forgetting task are shown in Table 1 (See below). For the MNIST dataset, a genetic algorithm to find optimal parameters was utilized, although this is not necessary and the summary results are based on hand-tuned parameters.

TABLE 1

Approximate description of parameters used in each of the 3 datasets.

| | Patches | MNIST | CUB200 |
|---|---|---|---|
| Architecture | [100, 4] | [784, 500, 500, 10] | [2048, 350, 300, 200] |
| Learning Rate | 0.1 | 0.065 | 0.1, 0.01 |
| Dropout | 0 | 0.2 | 0.25 |
| Epochs | 1 per task | 2 per task | 50 per task |
| Input Rate | 64 Hz | 130 Hz | 32 Hz |
| Thresholds | 1.045 | 2.1772, 1.5217, 0.9599 | 1, 1, 1 |
| Synaptic | 4.25 | 3.4723, 25.52, 2.4186 | 1, 1, 1 |
| Increase factor | 0.0035 | 0.0197 | 0.01 |
| Decrease factor | 0.0002 | 0.0016 | 0.001 |

B. Sleep Algorithm Advantages and Verified Examples
1) Sleep Prevents Catastrophic Forgetting and may Lead to Forward Transfer FIG. 1 illustrates an example implementation and evaluation 100 of the presently disclosed technology. Notably, the results demonstrate the improved performance in network recall provided by applying mechanisms of biological sleep in memory consolidation to existing artificial intelligence architectures. To start, FIG. 1A depicts a Patches dataset and represents an easily interpretable example to verify and validate the presently disclosed technology. In this example, 4 binary images of size 10×10 with 15 pixel overlap and 25% of pixels turned on are utilized. Thus, 10 pixels are unique amongst each image in the dataset. To determine if catastrophic forgetting occurs, and if sleep can recover performance, the dataset is split into two tasks—one task representing two images and the other task comprised of the other two images. Training on task 1 resulted on high performance on task 1 with no performance on task 2. After a sleep phase, performance on task 1 remained perfect, while task 2 performance sometimes revealed an increase. After training on task 2, performance on task 1 on average decreased from its perfect level, indicating forgetting of task 1. However, after sleep performance on both task 1 and task 2 was maximized at 100% (FIG. 1B). Including only one sleep phase at the end of awake training also resurrected performance on both tasks (FIG. 1C).

Figure 1D:
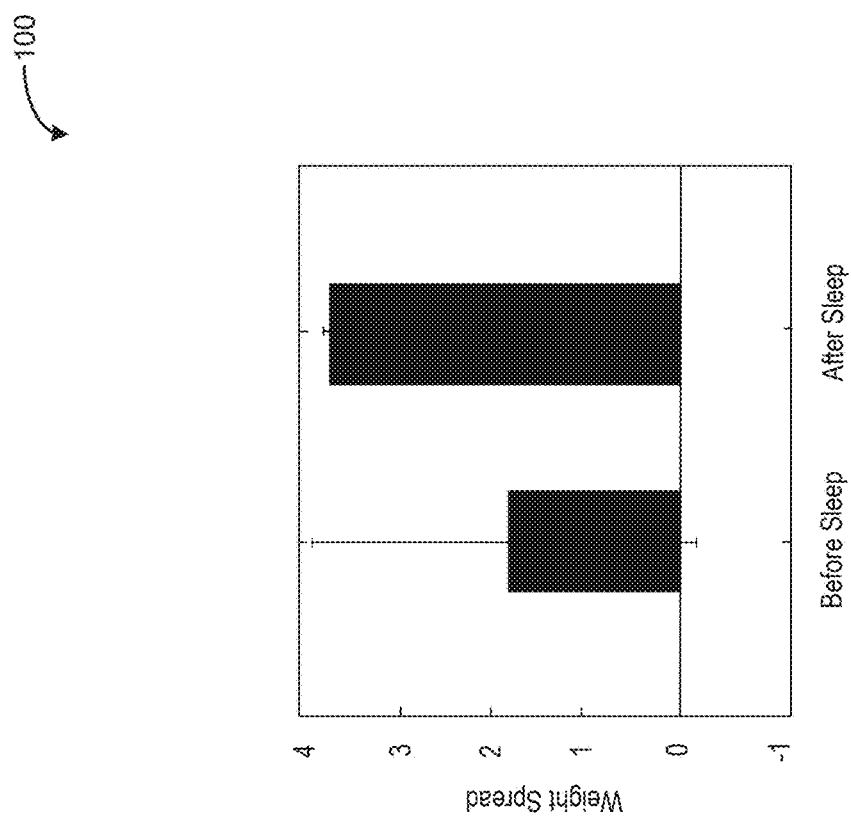
FIG. 1D illustrates an example bar graph comparing the spread of the weights connecting from on-pixels to output neurons vs. off-pixels, in accordance with various embodiments of the present disclosure.
Figure 1E:
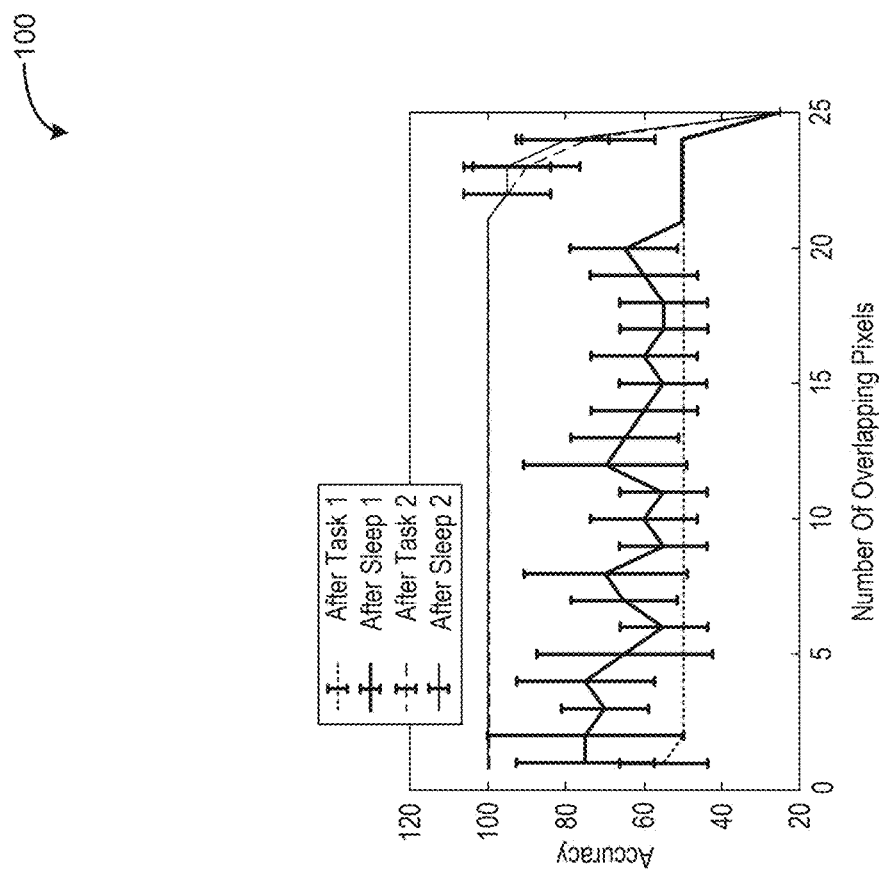
FIG. 1E illustrates an example graph of the accuracy as a function of number of overlapping pixels at different points in training, in accordance with various embodiments of the present disclosure.

To analyze how sleep prevents catastrophic forgetting in this toy dataset example, in some embodiments the weights connecting to each input neuron were assessed. Since knowledge of all pixels in the dataset is known, the weights connecting from pixels that are turned on in an image to the corresponding output neuron are measured. Ideally, for a given image, the spread between weights from on-pixels and weights from off-pixels should be high, such that on-pixels drive an output neuron and off-pixels suppress the same output neuron. To measure this, the average is computed spread across output neurons and weights for on-pixels and off-pixels (FIG. 1D). The results indicate that sleep increases the spread between weights connecting from on-pixels and off-pixels, validating the sleep algorithm is working correctly by increasing meaningful weights and decreasing potentially irrelevant or incorrect weights. Next, the performance was observed as a function of the number of overlapping pixels in the dataset for 2 cases: one with sleep after each awake training period and one with only one sleep at the end of training. With 2 sleep phases, after the first sleep, the network performs well on the first task and correctly classifies images from the second task about 50% of the time (FIG. 1E). This suggests that sleep increased performance on tasks for which the SNN has not seen any training input. An improvement on unseen future tasks is denoted as 'forward transfer' similar to zero-shot learning phenomenon previously shown in other architectures.

Figure 1F:
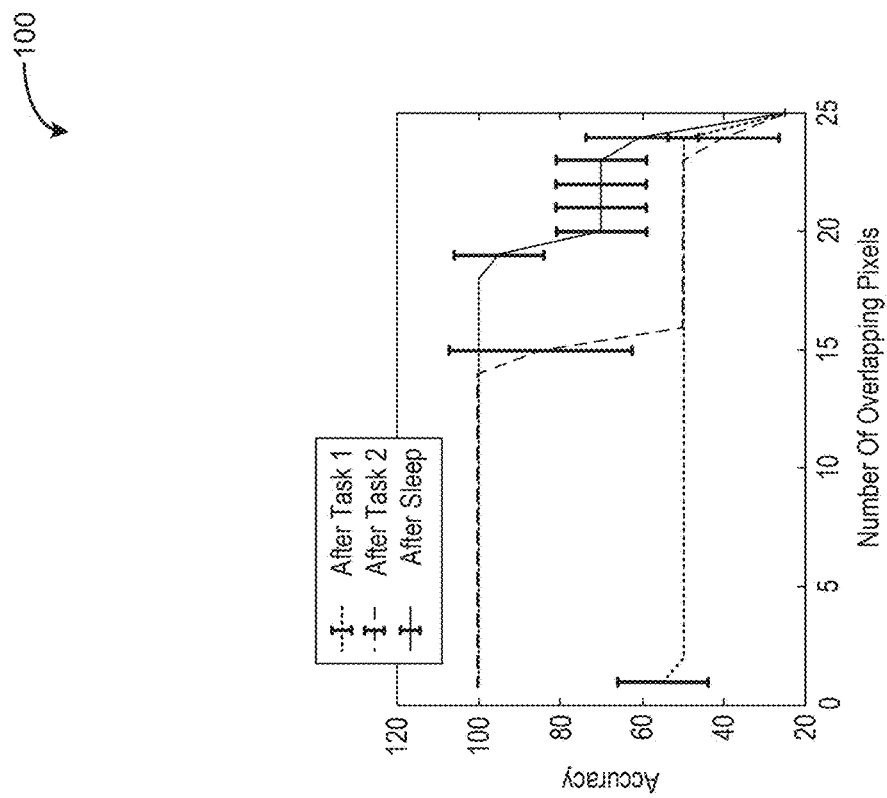
FIG. 1F illustrates the same as FIG. 1D but with one final sleep phase, in accordance with various embodiments of the present disclosure.

After training on the second task followed by sleep, the network may classify all the images correctly up to the very high level of pixel overlap. In the last case, it is observed that the sleep phase increases performance beyond that of the control network, indicating less catastrophic forgetting (FIG. 1F). Forgetting only occurs at a pixel overlap greater than 15 pixels. However, at higher pixel overlap values, sleep routinely reduces the amount of forgetting. Comparing the two cases, it is noted that an intermediate sleep phase between task one and task two actually increases performance and reduces forgetting after normal awake training on task two. This suggests that sleep may be useful in creating a forward transfer representation of similar, yet discrete, tasks and may boost transfer learning in other domains. Overall, these results validate the sleep algorithm and the same results may be obtained for more complex datasets.
2) Analysis of the Role of Sleep to Prevent Catastrophic Forgetting A simple case study is now presented to examine the cause of catastrophic failure and the role of sleep in recovering from it. While this example is not intended to model all scenarios of catastrophic forgetting, it extracts the intuition and explains the basic mechanism of the presently disclosed technology.

First, take a 3-layer network trained on two categories, each with just one example. Consider 2 binary vectors (Category 1 and Category 2) with some region of overlap.

For ReLU activations, the output is deemed to be the neuron with the highest activation in the output layer. Let the network be trained on Category 1 with backpropagation with a static learning rate. Following this, the network is trained on Category 2 in an equivalent fashion. The 3-layer network considered had had an input layer with 10 neurons, 30 hidden neuron and an output layer with 2 neurons for the 2 categories. Inputs were 10 bits long with 5 bit overlap. The learning rate of 0.1 for 4 epochs is trained.

The hidden neurons are divided into four types based on their activation for the two categories: A—those neurons that fire on Category 1 but not 2; B—those neurons that fire on Category 2 but not 1; C—those neurons that fire on Category 1 and 2; D—those that fire on neither, where firing indicates a non-zero activation. Note that these sets may change on training or sleep. Let Xi be the weights from type X to output i.

Consider the case where input of Category 1 is presented. The only hidden layer neurons that fire are A and C. Output neuron 1 will get the net value A*A1+C*C1 and output neuron 2 will get the net value A*A2+C*C2. For output neuron 1 to fire, two conditions need to hold: (1) A*A1+C*C1>0 (2) A*A1+C*C1>A*A2+C*C2. The second condition above can be rewritten as A*A2−A*A1<C*C1−C*C2, which separates the weights according to hidden neurons. Using this separation, the following definitions were utilized: Define a to be (A2−A1)*A on pattern 1; b to be (A2−A1)*A on pattern 2; p to be (C1−C2)*C on pattern 1 and q to be (C1−C2)*C on pattern 2. (Note that p and q are very closely correlated since they differ only in the activation values of C neurons which are positive in both cases).

So, on input pattern 1, output 1 fires only if a<p; on input pattern 2, output 2 fires only if q<b.

Following training on 2 categories, if the network could not recall Category 1, i.e., output neuron 1's activation is negative or less than that of output neuron 2, catastrophic forgetting has occurred. The second phase of training ensures q<b. This could involve reduction in q which would reduce p as well. (Since A does not fire on input pattern 2, back-propagation does not alter a) Reducing p may result in failing the condition a<p, i.e., misclassifying input 1.

Sleep may increase the difference in the weights (which are different enough to begin with) in this case as shown in previous work. So, the difference between A2 and A1 increases, thus decreasing a (as A1 is higher, a-A2-A1 decreases). The same thing happening to p is presented as follows: it is likely that at least one of the weights coming into a C neuron is negative, in which case, increasing the difference would involve making the negative weight more negative, resulting in the neuron joining either A or B (as it no longer fires for the pattern showing the negative weight), thus reducing p.

When the neurons in C remain, more complicated case arising: here, a decreases, but p may also decrease correspondingly; another undesirable scenario is when b decreases to become less than q. Typically sleep tends to drive the values of weights of opposite signs and weights of same sign to differ by some threshold value, away from each other (as mentioned earlier) but there are conditions when the difference between weights is below a threshold point for sleep to cause divergence. In cases where differences are above threshold sleep improved performance and sleep did improve performance when differences are lower.

3) Sleep Recovers Tasks Lost Due to Catastrophic Forgetting in MNIST and CUB200

ANNs have been shown to suffer from catastrophic forgetting whereby they perform well on the recently learned tasks but fail at previously learned tasks for various datasets including MNIST and CUB200. FIGS. 2A-2E provide an example implementation 200 of the presently disclosed technology applying MNIST and CUB200 datasets. Referring to FIGS. 2A-2E, an example process was conducted as follows: 5 tasks for the MNIST dataset and 2 tasks for the CUB200 dataset were created. Each pair of digits in MNIST were defined as a single task, and half of the classes in CUB200 were considered a single task. Each task was incrementally trained, followed by a sleep phase, until all tasks were trained. A baseline network trained incrementally without sleep performed poorly (FIG. 2D, black bar). However, it is noted a significant improvement in the overall performance, as well as task specific performance when sleep algorithm was incorporated into the training cycle (FIG. 2D, red bar).

Figure 2B:
Figure 2C:
Figure 2D:
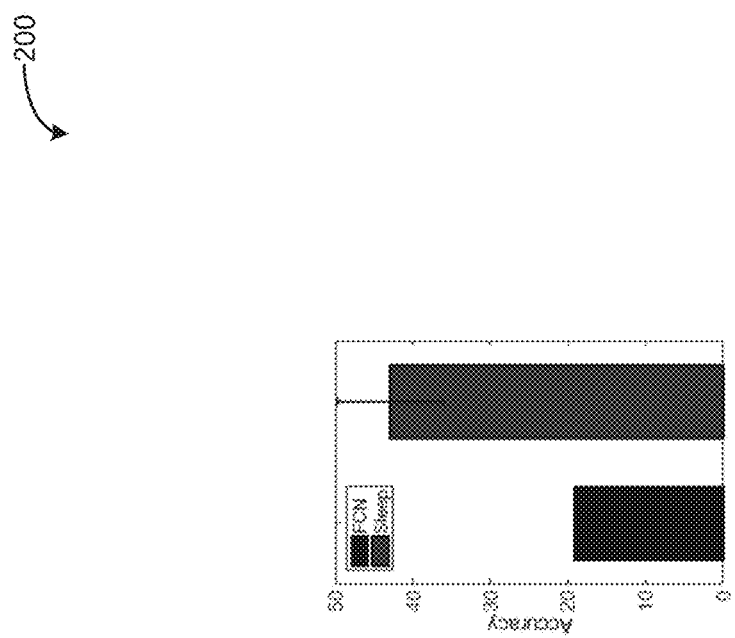
Figure 2E:
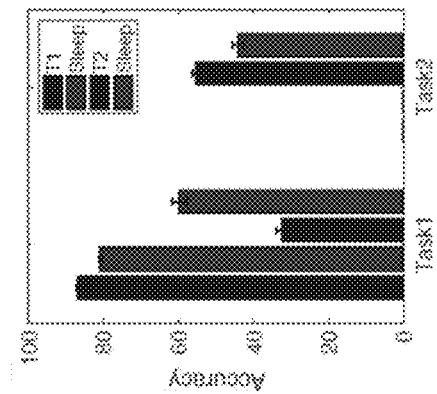
Figure 4A:
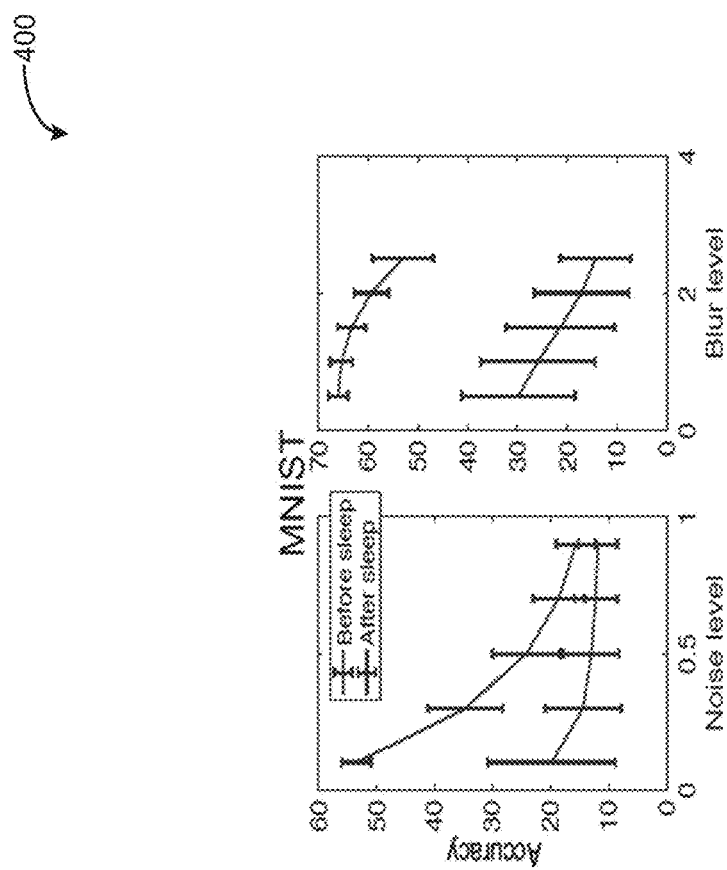
FIGS. 4A-4D provide an example implementation and evaluation of the sleep algorithm in MNIST and Patches datasets, in accordance with various embodiments of the present disclosure.
Figure 4B:
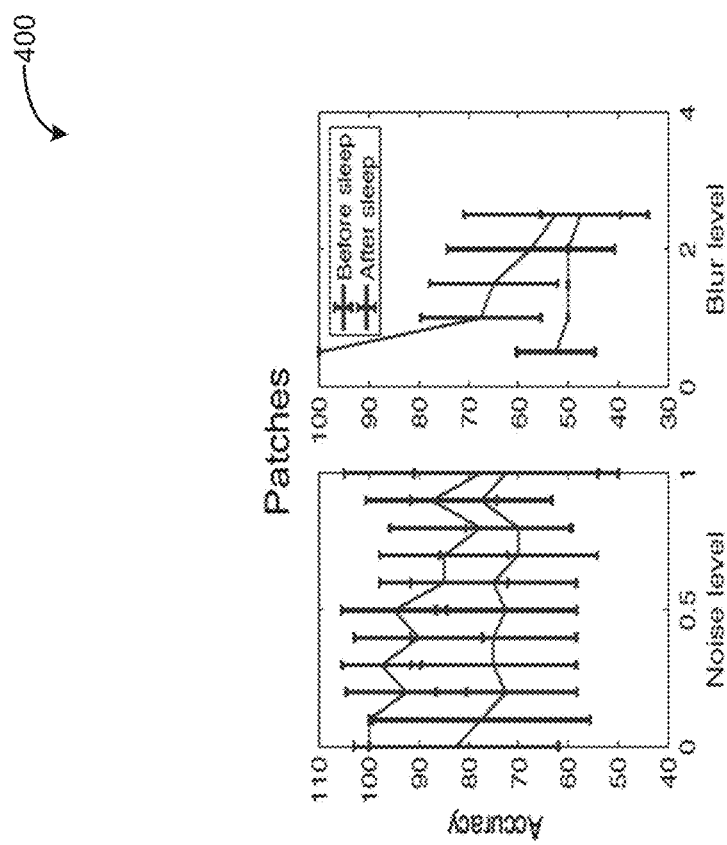
Figure 4C:
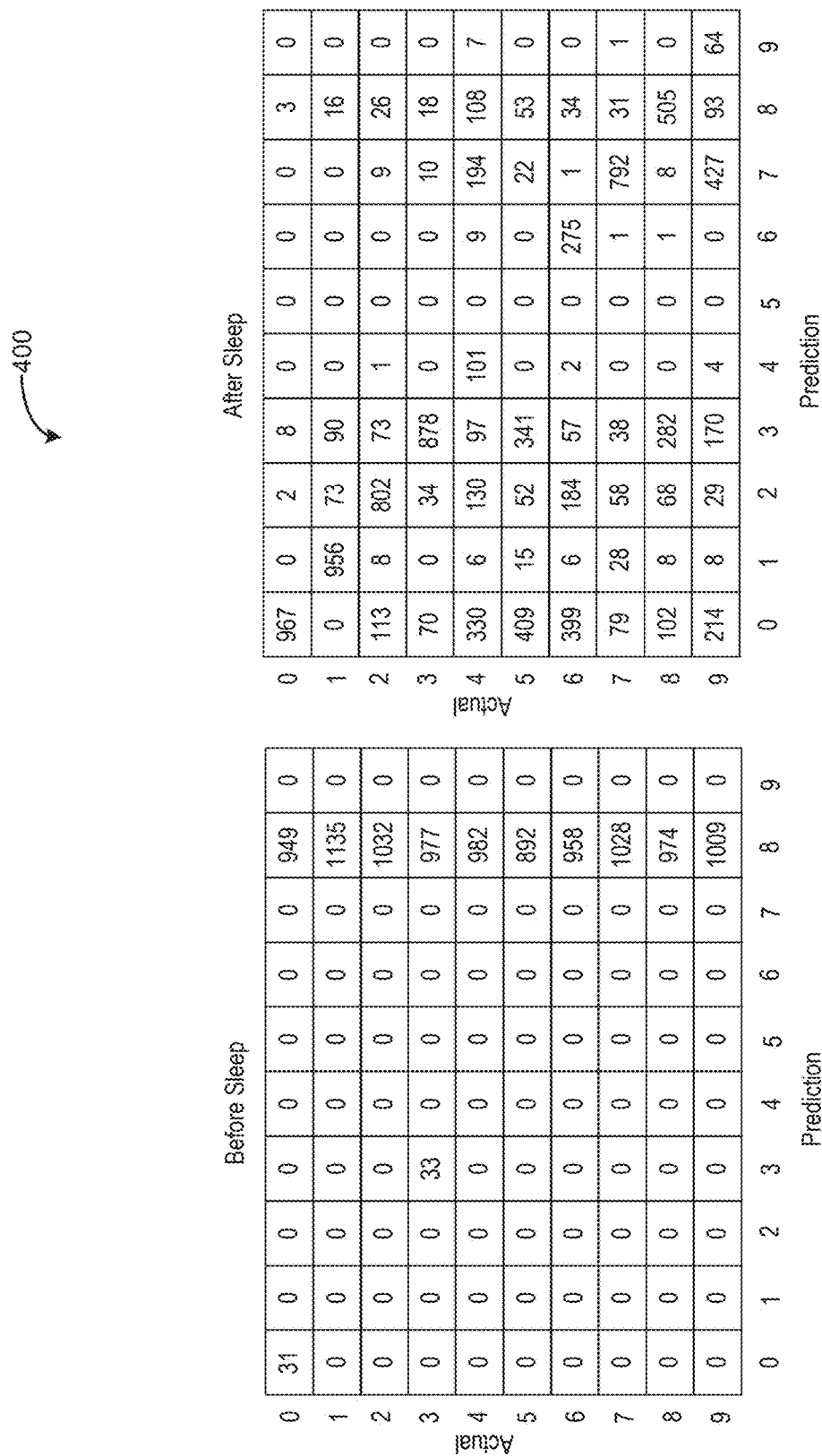
Figure 4D:

For MNIST, the results indicated each of the five tasks revealed an increase in classification accuracy after sleep even after being completely forgotten during awake training (FIG. 2A). For the 1st training+sleep cycle, the "before sleep" network only classifies images for the task that was seen during last training (digits 4-5 on the x-axis in FIG. 2B). After sleep, performance remains high on digits 4 and 5 but there is also spillover into the other digits. For the last training+sleep cycle, same effect was observed. Only last task performed well right after the training (FIG. 2C). After sleep, performance on almost all digits nearly recovered (FIG. 2D). On the CUB200 dataset, the results indicated that sleep can recover task 1 performance after training on task 2, with only minimal loss to task 2 performance (FIG. 2E). In conclusion, the sleep algorithm reduces catastrophic forgetting by reducing overlap between network activity for distinct classes.

Although specific performance numbers here are not as impressive as for generative models, they surpass certain regularization methods, such as EWC, on incremental learning.

Overall, several embodiments of the sleep algorithm can reduce catastrophic forgetting and interference with very little knowledge of the previously learned examples solely by utilizing STDP to reactivate forgotten weights. Ultimately, these results suggest that information about old tasks is not completely lost when catastrophic forgetting occurs from performance level perspective but the information remains present in the weights about old tasks and offline STDP phase can resurrect this hidden information. To achieve higher performance, offline STDP/sleep algorithm could be combined with generative replay to replay specific, rather than average, inputs during sleep.

4) Sleep Promotes Separation of Internal Representations for Different Inputs

As suggested by example embodiments above, sleep could separate the neurons belonging to the different input categories and prevent catastrophic forgetting. This would also result in a change in the internal representation of the different inputs in the network. The suggestion or finding was explored by analyzing the network trained on MNIST before and after sleep. In order to examine how the internal representation of the different tasks are related and modified after sleep, the correlation between ANN activation at different layers after awake training and after sleep was examined. Namely, FIGS. 3A-3D illustrate example correlation graphs 300 of the presently disclosed technology demonstrating sleep decreases representational overlap between MNIST classes at all layers. Referring to FIGS. 3A-3D, the average correlation was computed between activations of examples of class i with examples of class j. As seen in FIGS. 3A-3D, the correlation before sleep was higher both within the same input category and across all categories (FIGS. 3A and 3C, respectively). On the other hand, after sleep, the correlations between different categories were reduced while the correlation within category remained high (FIGS. 3A and 3D, respectively). As such, these correlation graphs suggest that sleep promotes decorrelating the internal representations of the input categories, illustrating a mechanism by which sleep can prevent catastrophic forgetting.

5) Sleep Improves Generalization

An additional advantage provided by the presently disclosed technology is elucidated by the tested effect of sleep on the common problem of generalization in machine learning. That is, previous research has reported a failure of neural networks to generalize beyond their explicit training set. Given that sleep may create a more generalized representation of stimulus parameters, the hypothesis that the sleep algorithm would increase ANN's ability to generalize beyond the training set was tested. To do so, noisy and blurred versions of the MNIST and Patches examples were created and tested the network before and after sleep on these distorted datasets. FIGS. 4A-4D illustrate the results 400 and establishes sleep can substantially increase the network's ability to classify degraded images. For both the MNIST and Patches dataset, the "after sleep" network substantially outperformed the "before sleep" network on classifying noisy and blurred images. This is shown in the confusion matrices in FIGS. 4C and 4D, where before sleep, the network trained on intact MNIST images favors one class over another when tested on degraded images. However, sleep restores the activity so that other classes are correctly predicted. It is important to note the MNIST network is trained sub-optimally to show a case where the network performs low on degraded images. The same network architecture can perform well without sleep on degraded images if the training dataset is significantly expanded.

These results highlight the benefit of utilizing sleep to generalize representation of the task at hand. ANNs are normally trained on highly filtered datasets that are identically and independently distributed. However, in a real-world scenario, inputs may not meet these assumptions. Incorporating a sleep-phase into training of ANNs may enable a more generalized representation of the input statistics, such that distributions which are not explicitly trained may still be represented by the network after sleep.

6) Sleep Improves Resistance to Adversarial Attacks

Figure 5A:
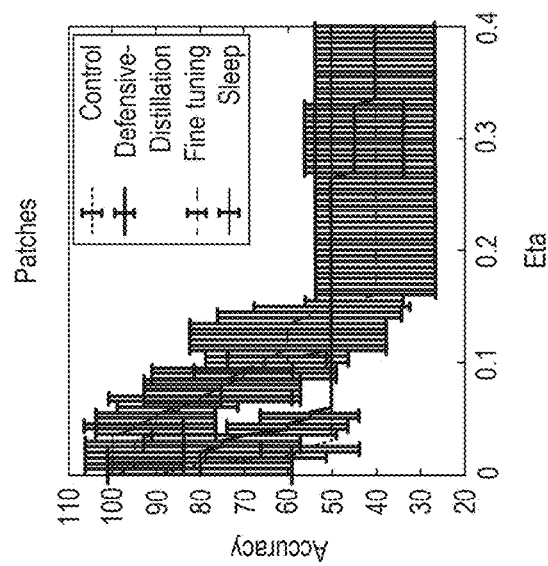
Figure 5B:
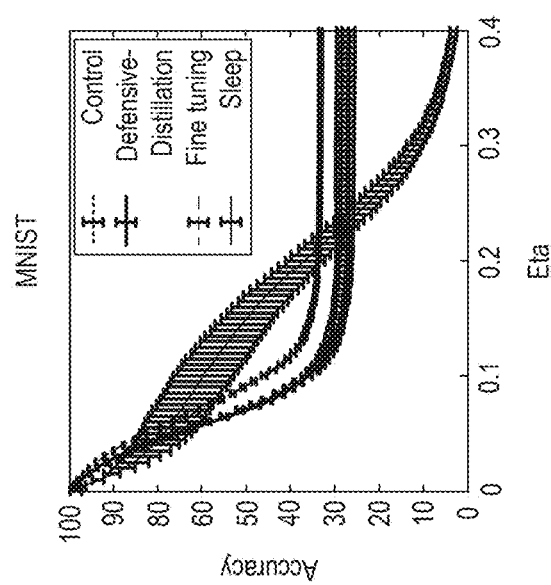
Figure 5C:
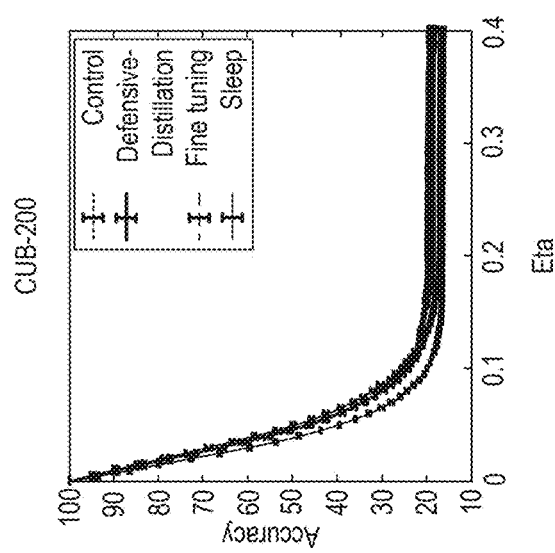

Another advantage provided by the presently disclosed technology is evidenced by the verified effect that sleep can have on the resistance to adversarial attacks of neural networks (network). Currently, networks are prone to adversarial attacks, whereby an attacker creates an example input that a network misclassifies. Usually adding an imperceptible amount of noise to an image (i.e., input) can change how a network classifies the image. This could lead to catastrophic effects when a network are utilized in real-world scenarios. The presently disclosed technology may reduce the impact of adversarial attacks in the same way that it increases the generalization ability of networks which enables machine learning architectures to be resistant to various types of noise, as supported in the datasets illustrated in FIGS. 5A-5D. Specifically, FIGS. 5A-5D provide an example implementation and evaluation of the sleep algorithm in Patches, MNIST, and CUB200 datasets during adversarial attacks. As suggested above, the sleep algorithm of the presently disclosed technology can reduce the impact of one or more adversarial attacks in the Patches dataset (FIG. 5A), the MNIST dataset (FIG. 5B), and the CUB200 dataset (FIG. 5C). Each graph provides a classification accuracy (x-axis) as a function of noise added, Eta (y-axis), for respective datasets. As shown, the sleep algorithm of the present disclosure overperformed a control algorithm in various datasets as well as various forms of adversarial attacks. As such, embodiments of the presently disclosed technology can simultaneously improve generalization of training data and resistance to adversarial attacks of networks.

C. Sleep Algorithm Hardware

Figure 6:
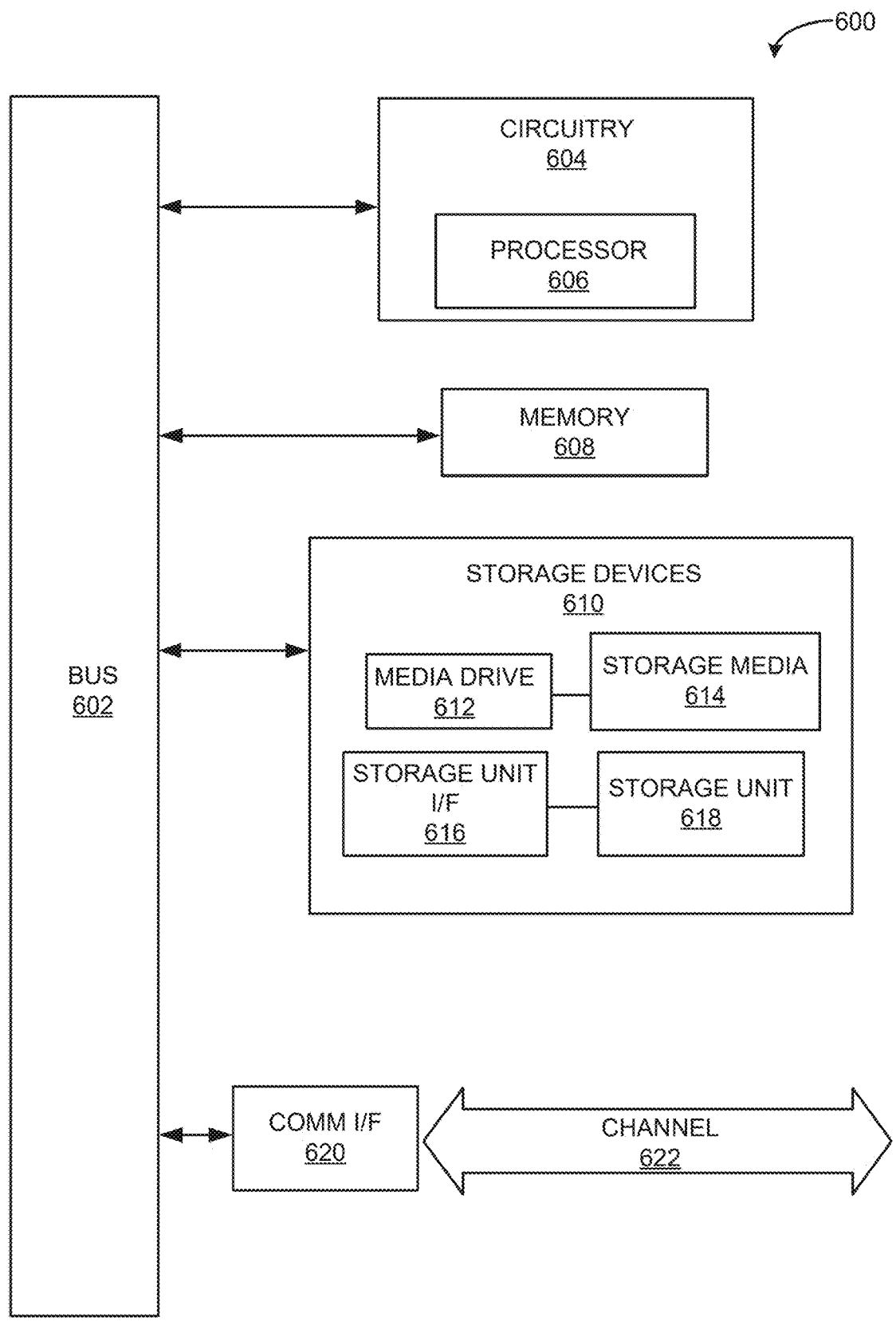
FIG. 6 illustrates an example computing component that may be used to implement features of various embodiments of the present disclosure.

FIG. 6 illustrates example computing component 600, which may in some instances include a processor on a computer system (e.g., control circuit). Computing component 600 may be used to implement various features and/or functionality of embodiments of the systems, devices, and methods disclosed herein. With regard to the above-described embodiments set forth herein in the context of systems, devices, and methods described with reference to FIGS. 1-6, including embodiments involving the control circuit, one of skill in the art will appreciate additional variations and details regarding the functionality of these embodiments that may be carried out by computing component 600. In this connection, it will also be appreciated by one of skill in the art upon studying the present disclosure that features and aspects of the various embodiments (e.g., systems) described herein may be implemented with respected to other embodiments (e.g., methods) described herein without departing from the spirit of the disclosure.

As used herein, the term component may describe a given unit of functionality that may be performed in accordance with one or more embodiments of the present disclosure. As used herein, a component may be implemented utilizing any form of hardware, software, or a combination thereof. For example, one or more processors, controllers, ASICs, PLAs, PALs, CPLDs, FPGAs, logical components, software routines, or other mechanisms may be implemented to make up a component. In implementation, the various components described herein may be implemented as discrete components or the functions and features described may be shared in part or in total among one or more components. In other words, as would be apparent to one of ordinary skill in the art after reading this description, the various features and functionality described herein may be implemented in any given application and may be implemented in one or more separate or shared components in various combinations and permutations. Even though various features or elements of functionality may be individually described or claimed as separate components, one of ordinary skill in the art will understand upon studying the present disclosure that these features and functionality may be shared among one or more common software and hardware elements, and such description shall not require or imply that separate hardware or software components are used to implement such features or functionality.

Where components or components of the disclosure are implemented in whole or in part using software, in embodiments, these software elements may be implemented to operate with a computing or processing component capable of carrying out the functionality described with respect thereto. One such example computing component is shown in FIG. 6. Various embodiments are described in terms of example computing component 600. After reading this description, it will become apparent to a person skilled in the relevant art how to implement example configurations described herein using other computing components or architectures.

Referring now to FIG. 6, computing component 600 may represent, for example, computing or processing capabilities found within mainframes, supercomputers, workstations or servers; desktop, laptop, notebook, or tablet computers; hand-held computing devices (tablets, PDA's, smartphones, cell phones, palmtops, etc.); or the like, depending on the application and/or environment for which computing component 600 is specifically purposed.

Computing component 600 may include, for example, one or more processors, controllers, control components, or other processing devices, such as a processor 606, and such as may be included in circuitry 604. Processor 606 may be implemented using a special-purpose processing engine such as, for example, a microprocessor, controller, or other control logic. In the illustrated example, processor 606 is connected to bus 602 by way of circuitry 604, although any communication medium may be used to facilitate interaction with other components of computing component 600 or to communicate externally.

Computing component 600 may also include one or more memory components, simply referred to herein as main memory 608. For example, random access memory (RAM) or other dynamic memory may be used for storing information and instructions to be executed by processor 606 or circuitry 604. Main memory 608 may also be used for storing temporary variables or other intermediate information during execution of instructions to be executed by processor 606 or circuitry 604. Computing component 600 may likewise include a read only memory (ROM) or other static storage device coupled to bus 602 for storing static information and instructions for processor 606 or circuitry 604.

Computing component 600 may also include one or more various forms of information storage devices 610, which may include, for example, media drive 612 and storage unit interface 616. Media drive 612 may include a drive or other mechanism to support fixed or removable storage media 614. For example, a hard disk drive, a floppy disk drive, a magnetic tape drive, an optical disk drive, a CD or DVD drive (R or RW), or other removable or fixed media drive may be provided. Accordingly, removable storage media 614 may include, for example, a hard disk, a floppy disk, magnetic tape, cartridge, optical disk, a CD or DVD, or other fixed or removable medium that is read by, written to or accessed by media drive 612. As these examples illustrate, removable storage media 614 may include a computer usable storage medium having stored therein computer software or data.

In alternative embodiments, information storage devices 610 may include other similar instrumentalities for allowing computer programs or other instructions or data to be loaded into computing component 600. Such instrumentalities may include, for example, fixed or removable storage unit 618 and storage unit interface 616. Examples of such removable storage units 618 and storage unit interfaces 616 may include a program cartridge and cartridge interface, a removable memory (for example, a flash memory or other removable memory component) and memory slot, a PCMCIA slot and card, and other fixed or removable storage units 618 and storage unit interfaces 616 that allow software and data to be transferred from removable storage unit 618 to computing component 600.

Computing component 600 may also include a communications interface 620. Communications interface 620 may be used to allow software and data to be transferred between computing component 600 and external devices. Examples of communications interface 620 include a modem or softmodem, a network interface (such as an Ethernet, network interface card, WiMedia, IEEE 1212.XX, or other interface), a communications port (such as for example, a USB port, IR port, RS232 port Bluetooth® interface, or other port), or other communications interface. Software and data transferred via communications interface 620 may typically be carried on signals, which may be electronic, electromagnetic (which includes optical) or other signals capable of being exchanged by a given communications interface 620. These signals may be provided to/from communications interface 620 via channel 622. Channel 622 may carry signals and may be implemented using a wired or wireless communication medium. Some non-limiting examples of channel 622 include a phone line, a cellular or other radio link, an RF link, an optical link, a network interface, a local or wide area network, and other wired or wireless communications channels.

In this document, the terms "computer program medium" and "computer usable medium" are used to generally refer to transitory or non-transitory media such as, for example, main memory 608, storage unit interface 616, removable storage media 614, and channel 622. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions may enable the computing component 600 or a processor 606 to perform features or functions of the present disclosure as discussed herein.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent component names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the components or functionality described or claimed as part of the component are all configured in a common package. Indeed, any or all of the various components of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A computer-implemented method for training and validating an ability of an artificial neural network (ANN) model to perform a task on noisy input, the computer-implemented method comprising:
   training a first ANN model to perform the task on training images, wherein the ANN model comprises a network of rectified linear units (ReLU) activation units and associated weights, wherein the ReLU activation units represent ReLU neurons with no bias;
   converting the ANN model to a spiking neural network (SNN) model, the converting comprising:
      mapping the weights of the ANN model to the SNN model, the SNN model comprising a network of units representing integrate-and-fire neurons, and
      converting features of the ANN model to represent spiking activity in the units of the SNN model;
   simulating a sleep phase in the SNN model by training the SNN model to perform the task on the training images, wherein training the SNN model comprises applying plasticity rules to the SNN model to modify the mapped weights, wherein the modified weights represent changes in pre-synaptic and post-synaptic spiking activity of the units of the SNN model;
   converting the SNN model to an updated ANN model by mapping the modified weights of the SNN model to the ANN model to generate the updated ANN model;
   applying transformations to the training images to generate noisy images, wherein the transformations comprise at least one of blurring the training images or adding noise to the training images; and
   applying the updated ANN to perform the task on the noisy images and recording an accuracy metric measuring the updated ANN's performance on the task.

2. The computer-implemented method of claim 1, wherein the training are obtained from at least one of Patches, MNIST, or CUB200 datasets.

3. The computer-implemented method of claim 2, wherein training parameters corresponding to the training images comprise at least one of an architecture, dropout, epochs, input rate, thresholds, synaptic, increase factor, and decrease factor.

4. The computer-implemented method of claim 3, wherein the training parameters of the Patches dataset comprises one or more of an architecture of one input layer with 100 units and one output layer with 4 units, 1 epoch per task, learning rate of 0.1, input rate of 64 Hz, and dropout of 0.

5. The computer-implemented method of claim 3, wherein the training parameters of the MNIST dataset comprises one or more of an architecture of one input layer with 784 units, two hidden layers with 500 units, and one output layer with 10 units, 2 epochs per task, learning rate of 0.065, input rate of 130 Hz, and dropout of 0.2.

6. The computer-implemented method of claim 3, wherein the training parameters of the CUB200 dataset comprises one or more of an architecture of one input layer with 2084 units, one hidden layer with 350 units, one hidden layer with 300 units, and one output layer with 200 units, 50 epochs per task, learning rate of 0.1 or 0.01, input rate of 32 Hz, and dropout of 0.25.

7. The computer-implemented method of claim 1, wherein the applied plasticity rules are configured to modify the connectivity of the SNN model to correspond to neuron firing during sleep and the applied plasticity rules are based on at least one of spike-timing dependent plasticity (STDP), Hebbian rules, hetero-synaptic, and homeostatic plasticity.

8. The computer-implemented method of claim 1, further comprising:
   repeating the computer-implemented method of claim 1 with new transformations to the training images until the accuracy metric measuring the second ANN's performance on the task exceeds a threshold.

9. A method for training and validating an ability of an artificial neural network (ANN) to perform a task on noisy input, the method comprising:
   training a first ANN to perform the task on training images;
   converting the first ANN to a spiked neural network (SNN), the converting comprising:
      mapping weights from the first ANN to the SNN, the SNN comprising a network of units representing integrate-and-fire neurons, and
      applying weight normalization and returning scale for each layer of the SNN;
   simulating a sleep phase in the SNN by training the SNN to perform the task on the training images, wherein training the SNN comprises applying plasticity rules to the SNN to modify the weights of the SNN based on spike-timing dependent plasticity (STDP);
   converting the SNN to a second ANN by mapping weights from the SNN to the first ANN to generate the second ANN;
   applying transformations to the training images to generate noisy images, wherein the transformations comprise at least one of blurring the training images or adding noise to the training images; and applying the second ANN to perform the task on the noisy images and recording an accuracy metric measuring the second ANN's performance on the task.

10. The method of claim 9, wherein the first ANN comprises a neural network configured to have ReLU units.

11. The method of claim 9, further comprising:
training the generated second ANN to perform a second task;
converting the generated second ANN to a second SNN;
simulating the sleep phase in the second SNN;
generating a third ANN;
training the generated third ANN to perform a third task;
converting the generated third ANN to a third SNN;
simulating the sleep phase in the third SNN;
generating a fourth ANN; and
applying the generated fourth ANN to the task and the second task.

12. The method of claim 9, further comprising:
repeating the method of claim 9 with new transformations to the training images until the accuracy metric measuring the second ANN's performance on the task exceeds a threshold.

13. A computer system comprising:
one or more processors; and
non-transitory memory storing instructions, which when executed by the one or more processors, cause the computer system to perform operations comprising:
training an artificial neural network (ANN) to perform a task on training images, the ANN comprising rectified linear units (ReLU) representing a network of neurons in the brain;
transforming the ANN to a spiking neural network (SNN), the transforming comprising:
replacing the ReLU of the ANN with spiking neurons implemented using a spiking mode, wherein the spiking mode comprises a threshold and a synaptic scaling factor to represent a firing rate of the spiking neurons; and
replacing weights between the ReLU with synaptic connections using a model applicable to the SNN, wherein the synaptic connections comprise a spiking neuronal model;
simulating a sleep phase for memory activation by training the SNN to perform the task on the training images, wherein training the SNN comprises implementing plasticity rules to modify synaptic weights of the SNN, the plasticity rules corresponding to at least one of Hebbian rules, spike-timing dependent plasticity (STDP), heterosynaptic, and homeostatic plasticity;
transforming the SNN to an updated trained ANN by transferring the modified synaptic weights of the SNN to the trained ANN;
applying transformations to the training images to generate noisy images, wherein the transformations comprise at least one of blurring the training images or adding noise to the training images; and
applying the updated ANN to perform the task on the noisy images and recording an accuracy metric measuring the updated ANN's performance on the task.

14. The computer system of claim 13, further comprising simulating SNN activity for a duration of time to induce changes to the connectivity structure of the SNN.

15. The computer system of claim 13, wherein transformation from the ANN to the SNN further comprises changing properties of the SNN in accordance with a type of activity, the type of activity comprising one or more of increasing a spiking threshold of the spiking neurons and increasing synaptic connection strength.

16. The computer system of claim 13, wherein the implemented plasticity rules are configured to modify the connectivity of the SNN to correspond to neuron firing during sleep and the applied plasticity rules are based on at least two of spike-timing dependent plasticity (STDP), Hebbian rules, hetero-synaptic, and homeostatic plasticity.

17. The computer system of claim 13, wherein the training images are obtained from at least one of Patches, MNIST, or CUB200 datasets.

18. The computer system of claim 17, wherein training parameters corresponding to the training images comprise at least one of an architecture, dropout, epochs, input rate, thresholds, synaptic, increase factor, and decrease factor.

19. The computer system of claim 17, wherein the training parameters of the Patches dataset comprises one or more of an architecture of one input layer with 100 units and one output layer with 4 units, 1 epoch per task, learning rate of 0.1, input rate of 64 Hz, and dropout of 0.

20. The computer system of claim 17, wherein the training parameters of the MNIST dataset comprises one or more of an architecture of one input layer with 784 units, two hidden layers with 500 units, and one output layer with 10 units, 2 epochs per task, learning rate of 0.065, input rate of 130 Hz, and dropout of 0.2.

21. A method for training and validating an ability of an artificial neural network (ANN) to perform a task on noisy input, the method comprising:
converting a first ANN to a spiked neural network (SNN), the converting comprising:
mapping weights from the first ANN to the SNN, the SNN comprising a network of units representing integrate-and-fire neurons, and
applying weight normalization and returning scale for each layer of the SNN;
simulating a sleep phase in the SNN by training the SNN to perform the task on training images, wherein training the SNN comprises applying plasticity rules to the SNN to modify the weights of the SNN based on spike-timing dependent plasticity (STDP);
converting the SNN to a second ANN by mapping weights from the SNN to the first ANN to generate the second ANN;
applying transformations to the training images to generate noisy images, wherein the transformations comprise at least one of blurring the training images or adding noise to the training images; and
applying the second ANN to perform the task on the noisy images and recording an accuracy metric measuring the second ANN's performance on the task.

* * * * *